(12) United States Patent (10) Patent No.: US 8,813,372 B2
Scott (45) Date of Patent: Aug. 26, 2014

(54) BLADE CLAMP MECHANISM

(75) Inventor: John S. Scott, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 517 days.

(21) Appl. No.: 12/209,916

(22) Filed: Sep. 12, 2008

(65) Prior Publication Data

US 2009/0071016 A1 Mar. 19, 2009

Related U.S. Application Data

(60) Provisional application No. 60/972,457, filed on Sep. 14, 2007.

(51) Int. Cl.
*B23D 51/00* (2006.01)
*B23D 51/10* (2006.01)

(52) U.S. Cl.
CPC ..................................... *B23D 51/10* (2013.01)
USPC .................... 30/337; 30/339; 30/392; 279/24

(58) Field of Classification Search
USPC ............ 30/339, 337, 392; 83/699.21, 698.11; 279/24, 29, 32, 76, 82, 30, 87
See application file for complete search history.

(56) References Cited

U.S. PATENT DOCUMENTS

| | | | |
|---|---|---|---|
| 2,411,028 A | 11/1946 | Davies et al. | |
| 3,024,032 A | 3/1962 | Nixon | |
| 3,398,965 A | 8/1968 | Cox | |
| 3,583,716 A | 6/1971 | Daniel, Jr. | |
| 3,750,283 A | 8/1973 | Hoffman | |
| 3,754,330 A | 8/1973 | Anderson et al. | |
| 3,823,473 A | 7/1974 | Hoffman | |
| 3,927,893 A | 12/1975 | Dillon et al. | |
| 3,964,163 A | 6/1976 | Russo | |

(Continued)

FOREIGN PATENT DOCUMENTS

| | | |
|---|---|---|
| DE | 3713208 | 11/1988 |
| DE | 4138986 | 6/1993 |

(Continued)

OTHER PUBLICATIONS

Search Report of GB0816750.4, dated Jan. 29, 2009.

(Continued)

*Primary Examiner* — Omar Flores Sanchez
(74) *Attorney, Agent, or Firm* — Michael Best & Friedrich LLP (57) ABSTRACT

A cutting tool clamp mechanism for a power tool includes a housing supported by a spindle, the spindle being configured to receive and drive a cutting tool. A clamping system is supported by the housing and a portion of the clamping system is movable relative to the spindle. The clamping system includes an actuator portion and an engaging portion coupled to the actuator portion. The clamping system has an engaged condition, in which the engaging portion is configured to secure the cutting tool to the spindle, and a released condition, in which the engaging portion is configured to disengage the cutting tool from the spindle. A biasing member positioned between the spindle and the clamping system biases the clamping system to the engaged condition. When the cutting tool is removed from the housing, the clamping system is configured to be held in the released condition, and upon insertion of the cutting tool into the housing, the clamping system moves from the released condition to the engaged condition.

10 Claims, 8 Drawing Sheets

(56) References Cited

U.S. PATENT DOCUMENTS

| | | |
|---|---|---|
| 4,020,555 A | 5/1977 | Hedrick |
| 4,083,112 A | 4/1978 | Palm |
| 4,106,181 A | 8/1978 | Mattchen |
| 4,204,692 A | 5/1980 | Hoffman |
| 4,243,342 A | 1/1981 | Marto |
| 4,285,129 A | 8/1981 | Hoffman |
| 4,294,013 A | 10/1981 | Krieg |
| 4,299,402 A | 11/1981 | Hoffman |
| 4,351,112 A | 9/1982 | Nalley |
| 4,441,255 A | 4/1984 | Hoffman |
| 4,470,196 A | 9/1984 | Hoffman |
| 4,528,753 A | 7/1985 | Kuhlmann et al. |
| 4,550,500 A | 11/1985 | Kuhlmann et al. |
| 4,601,477 A | 7/1986 | Barrett et al. |
| 4,628,605 A | 12/1986 | Clowers |
| 4,648,182 A | 3/1987 | Hoffman |
| 4,813,829 A | 3/1989 | Koppelmann |
| 4,864,727 A | 9/1989 | Chu |
| 5,000,614 A | 3/1991 | Walker et al. |
| 5,058,280 A | 10/1991 | Pollak et al. |
| 5,103,565 A | 4/1992 | Holzer, Jr. |
| 5,122,007 A | 6/1992 | Smith |
| 5,165,173 A | 11/1992 | Miller |
| 5,222,956 A | 6/1993 | Waldron |
| 5,233,892 A | 8/1993 | Roberts |
| 5,272,948 A | 12/1993 | Theising |
| 5,306,025 A | 4/1994 | Langhoff |
| 5,322,302 A | 6/1994 | Quirijnen |
| 5,324,052 A | 6/1994 | Ortmann |
| 5,340,129 A | 8/1994 | Wright |
| 5,351,590 A | 10/1994 | Everts et al. |
| 5,363,733 A | 11/1994 | Baird et al. |
| 5,402,580 A | 4/1995 | Seto et al. |
| 5,421,232 A | 6/1995 | Laverick |
| 5,433,008 A | 7/1995 | Barger et al. |
| 5,433,457 A | 7/1995 | Wright |
| 5,439,472 A | 8/1995 | Evans et al. |
| 5,443,276 A | 8/1995 | Nasser et al. |
| 5,458,346 A | 10/1995 | Briggs |
| 5,487,221 A | 1/1996 | Oda et al. |
| 5,573,255 A | 11/1996 | Salpaka |
| 5,575,071 A | 11/1996 | Phillips et al. |
| 5,647,133 A | 7/1997 | Dassoulas |
| 5,697,279 A | 12/1997 | Schnizler et al. |
| 5,722,309 A | 3/1998 | Seyerle |
| 5,724,742 A | 3/1998 | Grabowski |
| 5,794,352 A | 8/1998 | Dassoulas |
| 5,848,474 A | 12/1998 | Fortney et al. |
| 5,903,983 A | 5/1999 | Jungmann et al. |
| 5,934,846 A | 8/1999 | Ishii |
| 5,946,810 A | 9/1999 | Hoelderlin et al. |
| 5,954,347 A | 9/1999 | Buck et al. |
| 5,971,403 A | 10/1999 | Yahagi et al. |
| 5,984,596 A | 11/1999 | Fehrle et al. |
| 5,989,257 A | 11/1999 | Tidwell et al. |
| 5,996,452 A | 12/1999 | Chiang |
| 6,009,627 A | 1/2000 | Dassoulas et al. |
| 6,023,848 A | 2/2000 | Dassoulas et al. |
| 6,112,420 A | 9/2000 | Schickerling |
| 6,178,646 B1 | 1/2001 | Schnell et al. |
| 6,209,208 B1 | 4/2001 | Marinkovich et al. |
| 6,233,833 B1 | 5/2001 | Grant et al. |
| 6,237,231 B1 | 5/2001 | Jungmann et al. |
| 6,260,281 B1 | 7/2001 | Okumura et al. |
| 6,276,065 B1 | 8/2001 | Osada et al. |
| 6,295,736 B1 | 10/2001 | Dassoulas et al. |
| 6,502,317 B2 | 1/2003 | Dassoulas et al. |
| 6,612,039 B2 | 9/2003 | Kakiuchi et al. |
| 6,638,290 B2 | 10/2003 | Pascaloff et al. |
| 6,725,548 B1 | 4/2004 | Kramer et al. |
| 6,735,876 B2 | 5/2004 | Hirabayashi |
| 6,810,782 B2 | 11/2004 | Wuensch et al. |
| 6,848,186 B1 | 2/2005 | Chen et al. |
| 6,851,194 B1 | 2/2005 | Chen et al. |
| 6,854,187 B2 | 2/2005 | Huan |
| 6,877,751 B2 | 4/2005 | Hsing |
| 6,893,026 B2 | 5/2005 | Yoshimura et al. |
| 6,944,959 B2 | 9/2005 | Bigden et al. |
| 7,003,888 B2 | 2/2006 | Bigden et al. |
| 7,040,023 B2 | 5/2006 | Nemazi et al. |
| 7,107,690 B2 | 9/2006 | Lui et al. |
| 7,111,405 B2 | 9/2006 | Delfini et al. |
| 7,210,232 B2 | 5/2007 | Guo |
| 7,251,897 B2 * | 8/2007 | Shuhua ............................ 30/392 |
| 7,257,900 B2 | 8/2007 | Wheeler et al. |
| 7,325,315 B2 | 2/2008 | Bigden et al. |
| 7,441,338 B2 | 10/2008 | Delfini et al. |
| 7,871,080 B2 * | 1/2011 | Marini et al. .................... 279/71 |
| 8,117,757 B2 * | 2/2012 | Kuo ................................. 30/392 |
| 8,272,135 B2 * | 9/2012 | Zhou ................................ 30/392 |
| 2003/0150120 A1 | 8/2003 | Hartmann et al. |
| 2004/0035010 A1 | 2/2004 | Kakiuchi et al. |
| 2004/0194324 A1 | 10/2004 | Youn-Chyuan |
| 2005/0093252 A1 | 5/2005 | Park |
| 2005/0120568 A1 | 6/2005 | Wilson |
| 2005/0132584 A1 | 6/2005 | Cornwell et al. |
| 2005/0144791 A1 | 7/2005 | Ritter et al. |
| 2006/0053639 A1 | 3/2006 | Nakanishi |
| 2006/0096103 A1 | 5/2006 | Roberts |
| 2006/0174495 A1 | 8/2006 | Jumior |
| 2007/0101587 A1 | 5/2007 | Bone |
| 2007/0131075 A1 | 6/2007 | Zhang et al. |
| 2007/0131076 A1 | 6/2007 | Yasheng |
| 2007/0151112 A1 | 7/2007 | Rakaczki |
| 2007/0163415 A1 | 7/2007 | Ritter et al. |

FOREIGN PATENT DOCUMENTS

| | | |
|---|---|---|
| DE | 9305188 | 6/1993 |
| DE | 4311161 | 10/1994 |
| EP | 0544129 | 6/1993 |
| EP | 0582326 | 2/1994 |
| EP | 0623413 | 11/1994 |
| EP | 0833459 | 4/1998 |
| EP | 1529586 A1 | 5/2005 |
| ES | 2069364 | 5/1995 |
| GB | 772079 | 8/1954 |
| GB | 2192363 A | 1/1988 |
| GB | 2296888 | 7/1996 |
| GB | 2342314 | 4/2000 |
| JP | 2001179534 A | 7/2001 |
| JP | 2003117723 A | 4/2003 |
| WO | 8908524 | 9/1989 |
| WO | 9527583 | 10/1995 |
| WO | 9731745 | 9/1997 |

OTHER PUBLICATIONS

DeWalt Reciprocating Saw, (See Exhibit A) in public use prior to Sep. 12, 2007.
Metabo Reciprocating Saw, (See Exhibit B) in public use prior to Sep. 12, 2007.
Ridgid Reciprocating Saw, (See Exhibit C) in public use prior to Sep. 12, 2007.
Hitachi Reciprocating Saw, (See Exhibit D) in public use prior to Sep. 12, 2007.
Makita Reciprocating Saw, (See Exhibit E) in public use prior to Sep. 12, 2007.
Bosch Reciprocating Saw, (See Exhibit F) in public use prior to Sep. 12, 2007.
Office Action from the United States Patent and Trademark Office for U.S. Appl. No. 12/209,924 dated Jun. 7, 2012 (8 pages).
Office Action from the United States Patent and Trademark Office for U.S. Appl. No. 12/209,924 dated Dec. 28, 2012 (8 pages).
Office Action from the United States Patent and Trademark Office for U.S. Appl. No. 12/209,924 dated Sep. 19, 2013 (11 pages).
Office Action from the United States Patent and Trademark Office for U.S. Appl. No. 12/209,924 dated Jun. 13, 2013 (11 pages).

* cited by examiner

BLADE CLAMP MECHANISM

CROSS-REFERENCE TO RELATED APPLICATION(S)

This application claims priority to U.S. Provisional Patent Application No. 60/972,457, entitled "BLADE CLAMP MECHANISM", filed Sep. 14, 2007 by John S. Scott, the entire contents of which is hereby incorporated by reference.

BACKGROUND

The present invention relates to reciprocating saws and more specifically to a blade clamp mechanism for quickly and easily replacing and securing a saw blade to a spindle of a reciprocating saw.

Hand held reciprocating tools, such as electric reciprocating saws, include removable blades, which permit the use of different cutting edges as may be necessary for cutting different materials and for the replacement of worn or damaged blades. This requires a blade mounting system that allows rapid blade replacement while accurately and firmly coupling the blade to the tool. Typically, blade mounting systems require a tool, such as an Allen wrench or a special key, in order to replace and secure the blade, which is a slow and often difficult process.

SUMMARY

The invention provides a cutting tool clamp mechanism. The cutting tool clamp mechanism comprises a housing supported by a spindle, the spindle being configured to receive and drive a cutting tool. A clamping system is supported by the housing and a portion of the clamping system is movable relative to the spindle. The clamping system includes an actuator portion and an engaging portion coupled to the actuator portion. The clamping system has an engaged condition, in which the engaging portion is configured to secure the cutting tool to the spindle, and a released condition, in which the engaging portion is configured to disengage the cutting tool from the spindle. A biasing member is positioned between the spindle and the clamping system, and biases the clamping system to the engaged condition. When the cutting tool is removed from the housing, the clamping system is configured to be held in the released condition, and upon insertion of the cutting tool into the housing, the clamping system moves from the released condition to the engaged condition.

The invention further provides a cutting tool clamp mechanism. The cutting tool clamp mechanism comprises a housing supported by a spindle, the spindle being configured to receive and drive a cutting tool. A clamping system is supported by the housing, and includes a portion of the clamping system movable relative to the spindle and an engaging portion. The clamping system has an engaged condition, in which the engaging portion is configured to secure the cutting tool to the spindle, and a released condition, in which the engaging portion is configured to disengage the cutting tool from the spindle. A first biasing member is positioned between the spindle and the clamping system, and biases the engaging portion to the engaged condition to releasably couple the cutting tool to the spindle. An ejection system includes an ejector member and a second biasing member for biasing the ejector member to eject the cutting tool from the clamping system. The ejector member is configured to hold the engaging portion in the released condition when the cutting tool is removed from the housing.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
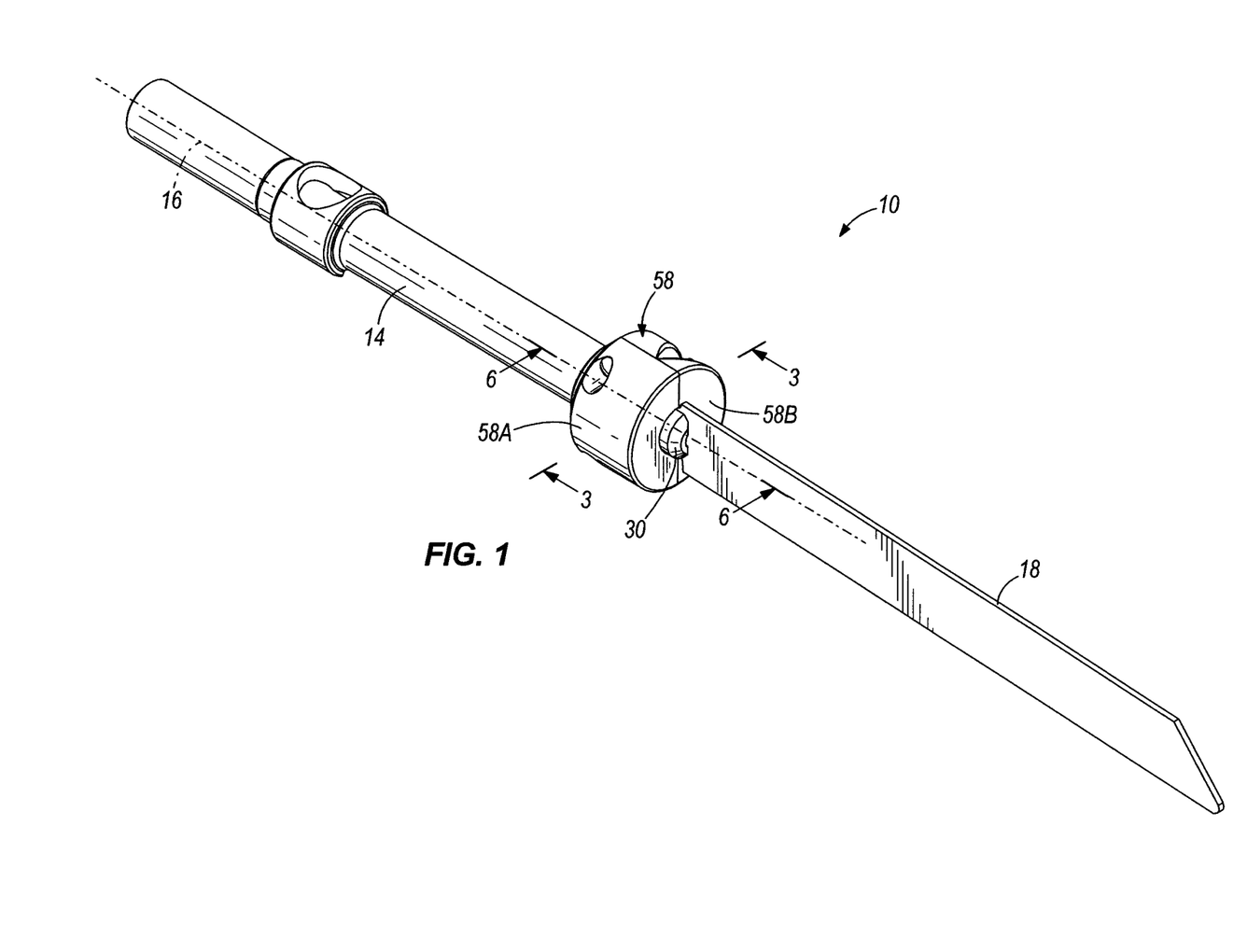
FIG. 1 is a perspective view of a blade clamp mechanism according to an embodiment of the invention.

FIGS. 1-8 illustrate a tool clamp mechanism 10 according to one embodiment of the invention. With reference to FIG. 1, the illustrated the tool clamp mechanism 10 is mounted on a spindle 14 of a reciprocating saw (not shown), and is shown engaging a tool 18 (e.g., a saw blade) having a main portion 22 and a tang 26. Thus, the tool clamp mechanism 10 constitutes a clamp mechanism for the saw blade 18 (i.e., a blade clamp mechanism). In other embodiments, various reciprocating tools (e.g., saw blades) and/or rotating tools (e.g., drill bits) may be used with the tool clamp mechanism.

Figure 2:
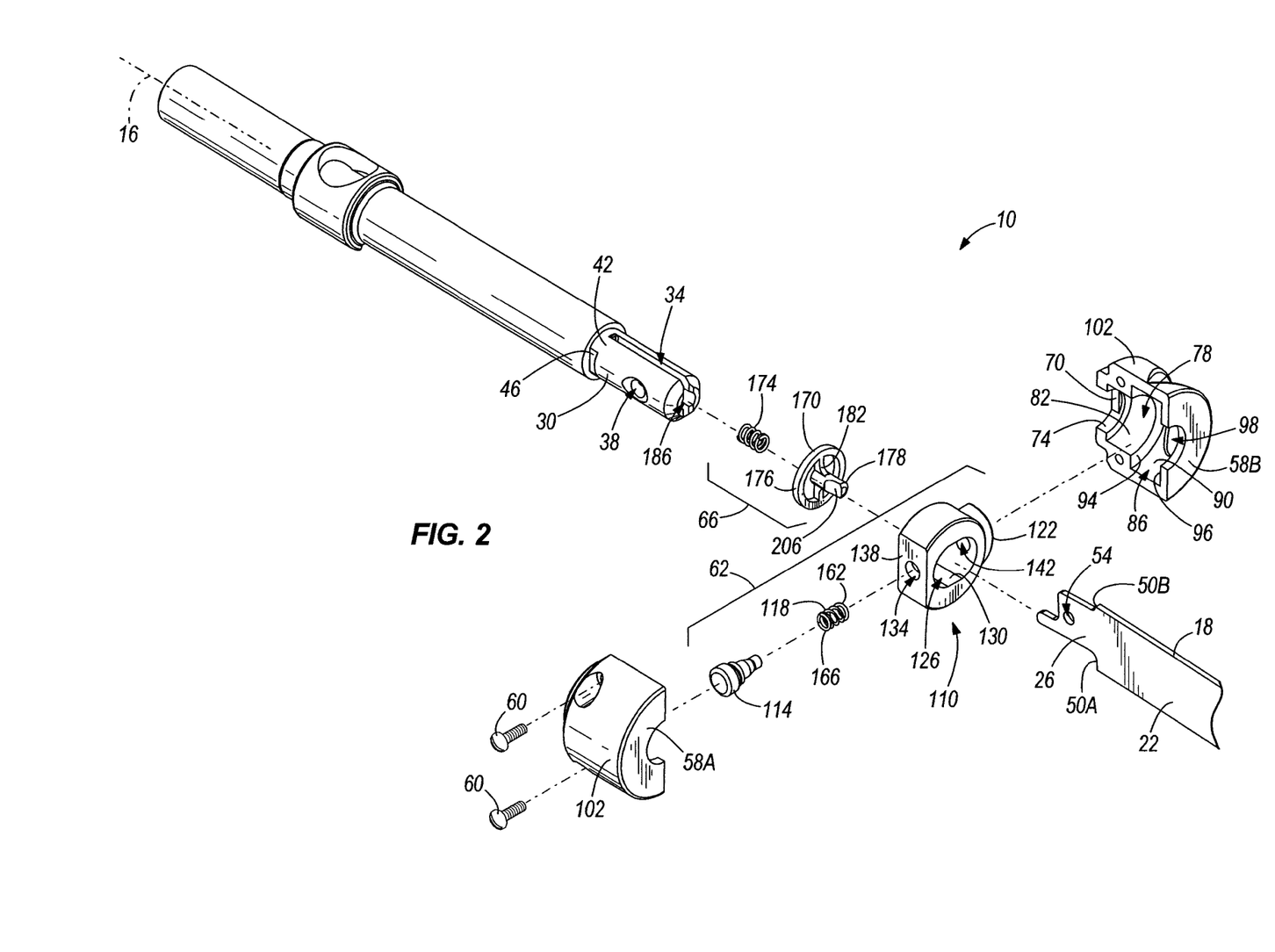
FIG. 2 is an assembly view of the blade clamp mechanism shown in FIG. 1.

The spindle 14 is adapted to be mounted for reciprocation within a body of the reciprocating saw along a longitudinal axis 16 of the spindle 14. A drive portion (not shown) of the spindle 14 is adapted to be driven by a wobble plate or other mechanism (not shown), as is generally known in the art. Referring to FIG. 2, the spindle 14 has an assembly seat 30 that includes an axially extending slot 34 for receiving the tang 26 of the blade 18, an aperture 38 extending from an exterior surface 42 of the assembly seat 30 to the slot 34, and two generally planar surfaces 46 on the exterior surface 42 of the spindle assembly seat 30 (only one is shown in FIG. 2). In further embodiments, the planar surfaces 46 may be only one planar surface or more than two planar surfaces.

Figure 6:
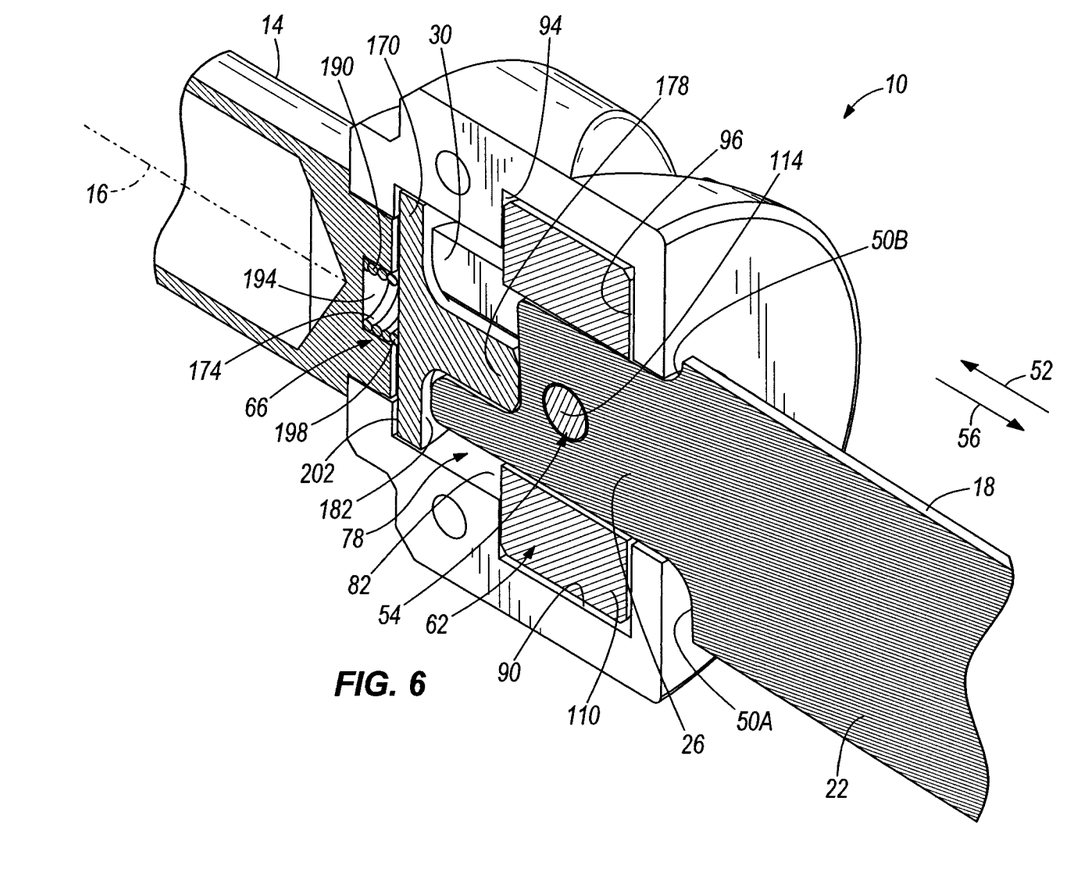
FIG. 6 is a sectional view of the blade clamp mechanism taken along line 6-6 in FIG. 1, and showing the blade clamp mechanism in the engaged condition.
Figure 7:
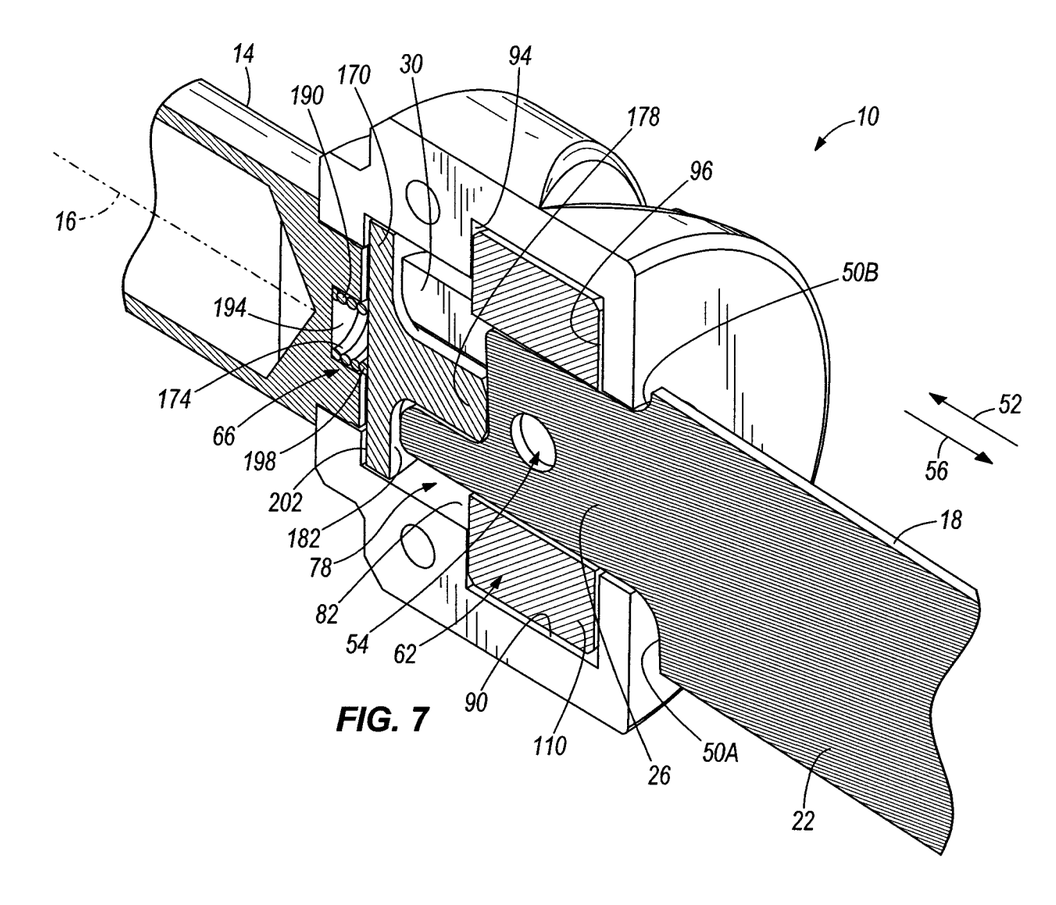
FIG. 7 is a sectional view of the blade clamp mechanism showing the blade clamp mechanism in the released condition.

The saw blade 18 includes two shoulder portions 50A, 50B that form a transition from the tang 26 to the main portion 22 (FIGS. 2, 6 and 7). The saw blade 18 is able to be inserted into the spindle 14 in a first axial direction 52 and removed from the spindle 14 in a second axial direction 56 opposite of the first axial direction 52. When the tang 26 of the saw blade 18 is inserted into the slot 34, the shoulder portions 50A, 50B of the saw blade 18 engage the blade clamp mechanism 10 at two locations (FIGS. 1, 6 and 7). The blade 18 further includes an aperture 54 (FIGS. 2-4, 6 and 7) to facilitate engagement of the blade 18 with the blade clamp mechanism 10.

With reference to FIG. 2, the blade clamp mechanism 10 includes a housing 58 (FIG. 1), a clamping system 62 for engaging and disengaging the saw blade 18, and an ejection system 66 for automatically ejecting the tool 18 from the blade clamp mechanism 10. FIGS. 1-8 illustrate the housing 58 of the blade clamp mechanism 10 adaptable to the assembly seat 30 of the spindle 14. The housing 58 has two members 58A, 58B; however in other embodiments the housing 58 may be a single member or more than two members. In this embodiment, the two members 58A, 58B are generally mirror images of each other. The members 58A, 58B are located around the assembly seat 30 with the members 58A, 58B secured to one another by fasteners 60 (e.g., bolts). In other embodiments, the members 58A, 58B may be secured by methods such as welding, clamping, snap rings and other fastening methods available to one skilled in the art.

Each housing member 58A, 58B includes a generally planar surface 70 on a first interior surface 74 of the housing members, which may be a plurality of surfaces. The planar surfaces 70 of the housing 58 align with the planar surfaces 46 of the spindle 14 and the coupling prevents rotational and axial movement of the housing 58 with respect to the spindle 14. Each housing member 58A, 58B also includes a frame channel 78 (i.e., the space around the exterior surface 42 of the assembly seat 30 in FIGS. 6-8) defined by a second interior surface 82, an inner cavity 86 defined by a third interior surface 90 (i.e., a cam surface), a first axial wall 94 also defined by the third interior surface 90, and a second axial wall 96 opposite the first axial wall 94 and defined by the third interior surface 90. In the illustrated embodiment, the housing member 58B includes an aperture 98 extending through the housing member 58B from an exterior surface 102 of the housing 58 to the third interior surface 90. In other embodiments, the aperture 98 can extend through the housing member 58A from the exterior surface 102 to the third interior surface 90.

The clamping system 62 includes an actuator portion 110, an engaging portion 114 coupled to the actuator portion 110 for synchronized movement therewith, and a biasing member 118 for biasing the actuator portion 110. In the illustrated embodiment, the actuator portion 110 is a user-actuated button, the engaging portion 114 is a detent and the biasing member 118 is a spring (e.g., a compression spring). In other embodiments, the actuator portion 110 is any device that can be actuated by a user, a robot and/or other mechanical devices known in the art. Referring to FIGS. 2-5, the actuator portion 110 includes a hub or tab 122, an area 126 defined by an interior surface 130 to receive the assembly seat 30 of the spindle 14, an aperture 134 extending through the actuator portion 110 from a wall or surface 138 of the actuator portion 110 to the interior surface 130, and a cavity 142 extending into the tab 122 of the actuator portion 110 from the interior surface 130. The actuator portion 110 is able to be moved in a first transverse direction 144 and a second transverse direction 148, opposite the first transverse direction 144.

Figure 3:
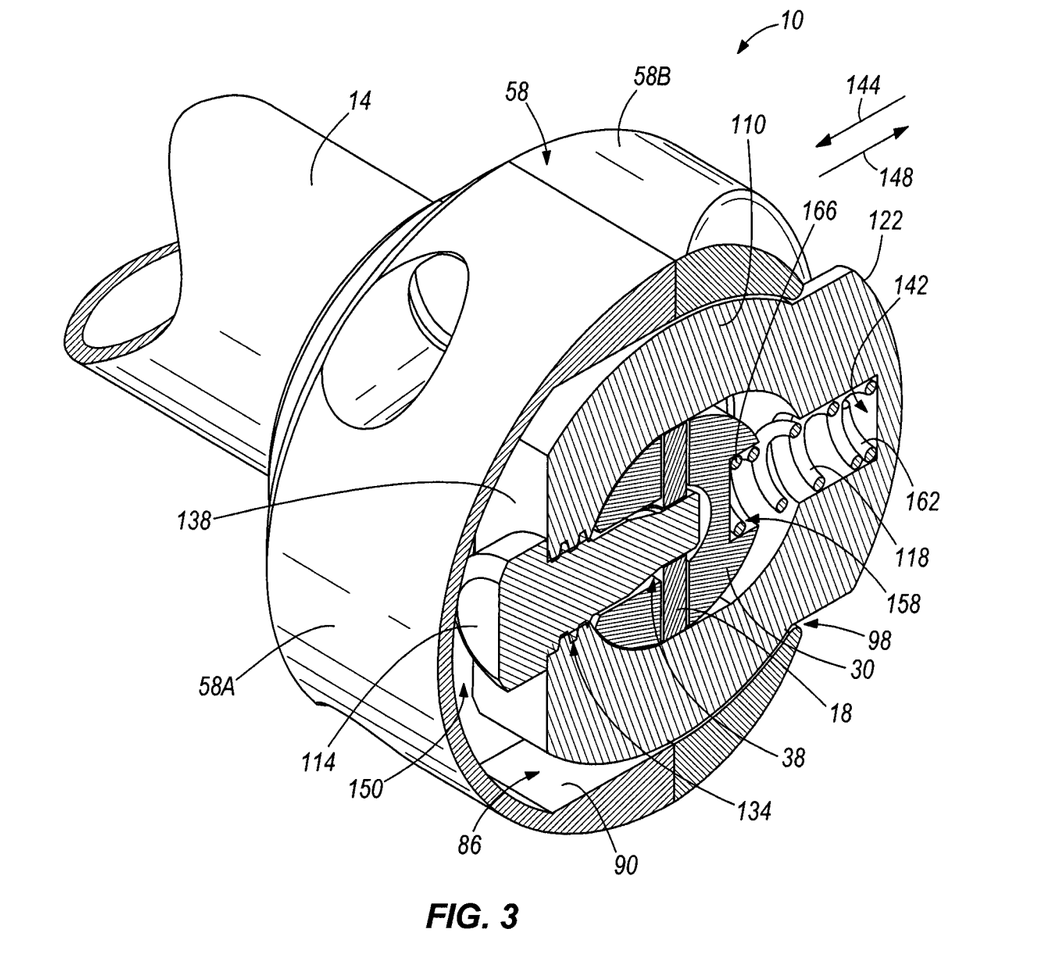
FIG. 3 is a sectional view of the blade clamp mechanism taken along line 3-3 in FIG. 1, and showing the blade clamp mechanism in an engaged condition.
Figure 4:
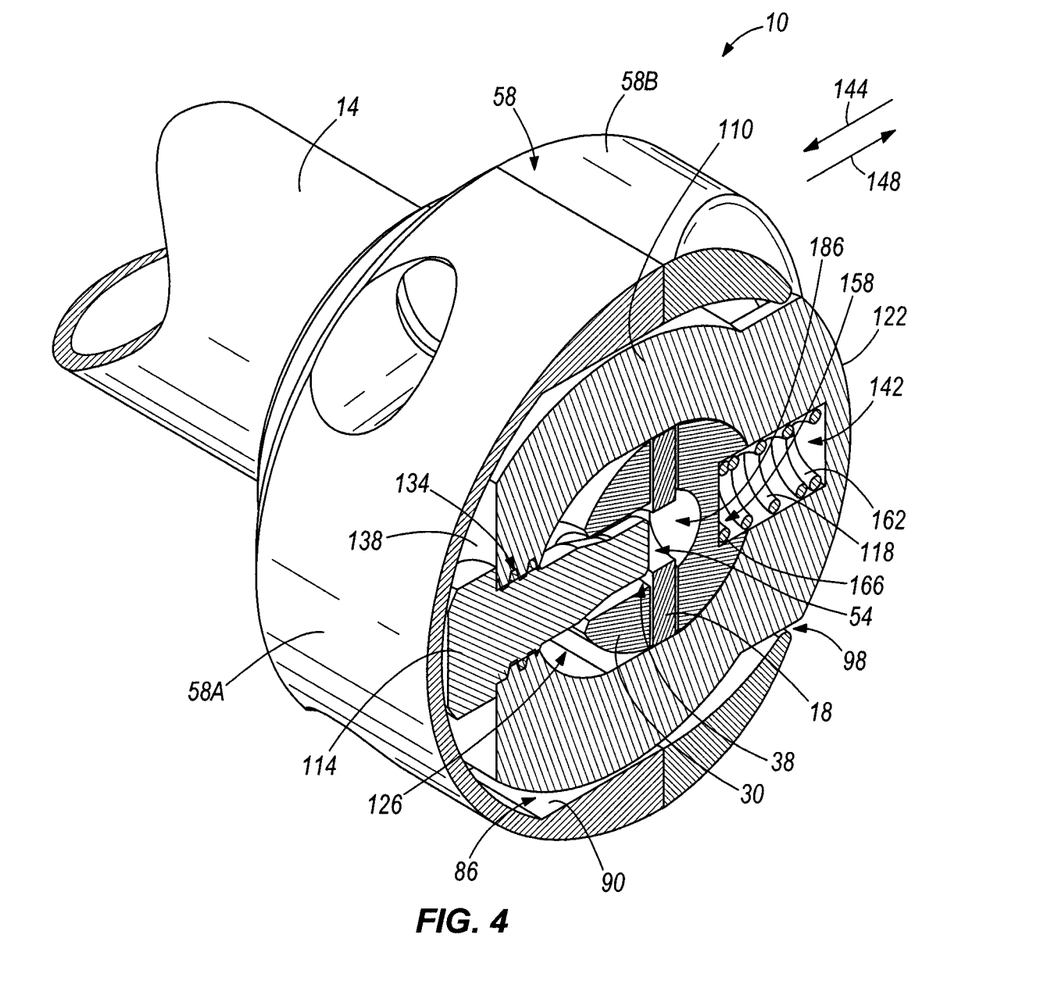
FIG. 4 is a sectional view of the blade clamp mechanism showing the blade clamp mechanism in a released condition.
Figure 5:
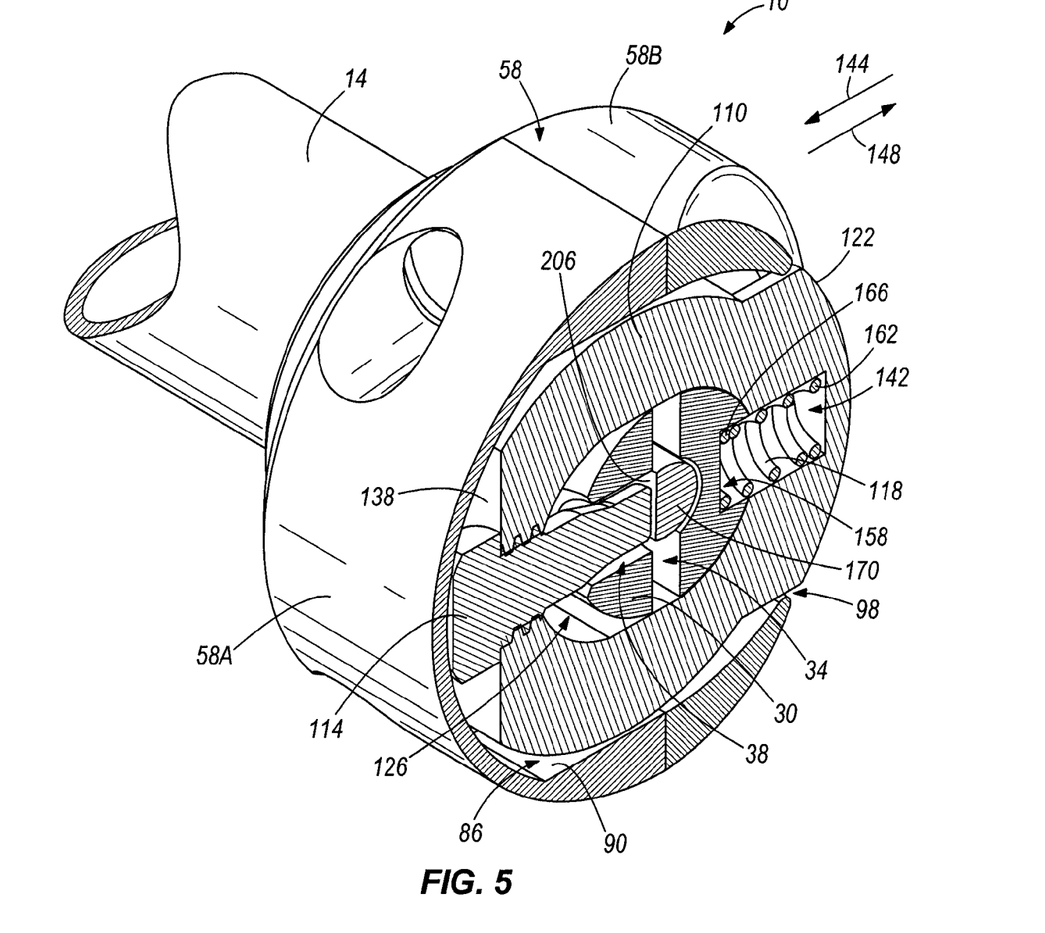
FIG. 5 is a sectional view of the blade clamp mechanism showing the blade clamp mechanism in a no-blade condition.

The inner cavity 86 of the housing 58 encompasses the actuator portion 110 of the clamping system 62. The third interior surface 90 defining the inner cavity 86 facilitates transverse, or perpendicular, movement of the actuator portion 110 with respect to the longitudinal axis 16 of the spindle 14 within the housing 58. The axial walls 94, 96 of the inner cavity 86 substantially abut the actuator portion 110 to restrict axial movement. Referring to FIGS. 3-5, a gap 150 (i.e., a portion of the inner cavity 86 shown in FIG. 3) formed between the clamping system 62 and the housing 58 (when the blade clamp mechanism 10 is assembled) permits movement of the actuator portion 110 in the first and second transverse directions 144, 146. The aperture 98 in the housing member 58B allows for the tab 122 of the actuator portion 110 to protrude from the housing 58. In additional embodiments, the tab 122 may be recessed or aligned with respect to the exterior surface 102 of the housing 58 such that the aperture 98 provides a space for communicating actuator motion. In this embodiment, the tab 122 extending through the aperture 98 also aids in restricting undesired transverse, rotational and axial movement.

In the illustrated embodiment, the detent 114 is threadably coupled in the aperture 134, which extends from the surface 138 of the actuator portion 110 to the area 126 receiving the spindle 14 (FIGS. 3-5). In further embodiments, the detent 114 may be coupled to the actuator portion 110 by other means or integrally formed with the actuator portion 110. The clamping system 62 (i.e., the actuator portion 110 and the detent 114) is moveable within the housing 58, and alignment of the aperture 134 of the actuator portion 110 and the aperture 38 of the spindle 14 releasably seats the detent 114 within the aperture 38 of the spindle 14.

Referring to FIGS. 3-5, the biasing member 118 includes a first leg 162 positioned within the cavity 142 of the actuator portion 110 and a second leg 166 positioned within a cavity 158 of the spindle 14. The cavity 158 extends into the spindle 14 from the exterior surface 42 and is aligned with the cavity 142 of the actuator portion 110. The biasing member 118 constitutes an embodiment of a first biasing member and is positioned to bias the detent 114 of the clamping system 62 into the slot 34 and therein into engagement with the blade 18.

Figure 8:
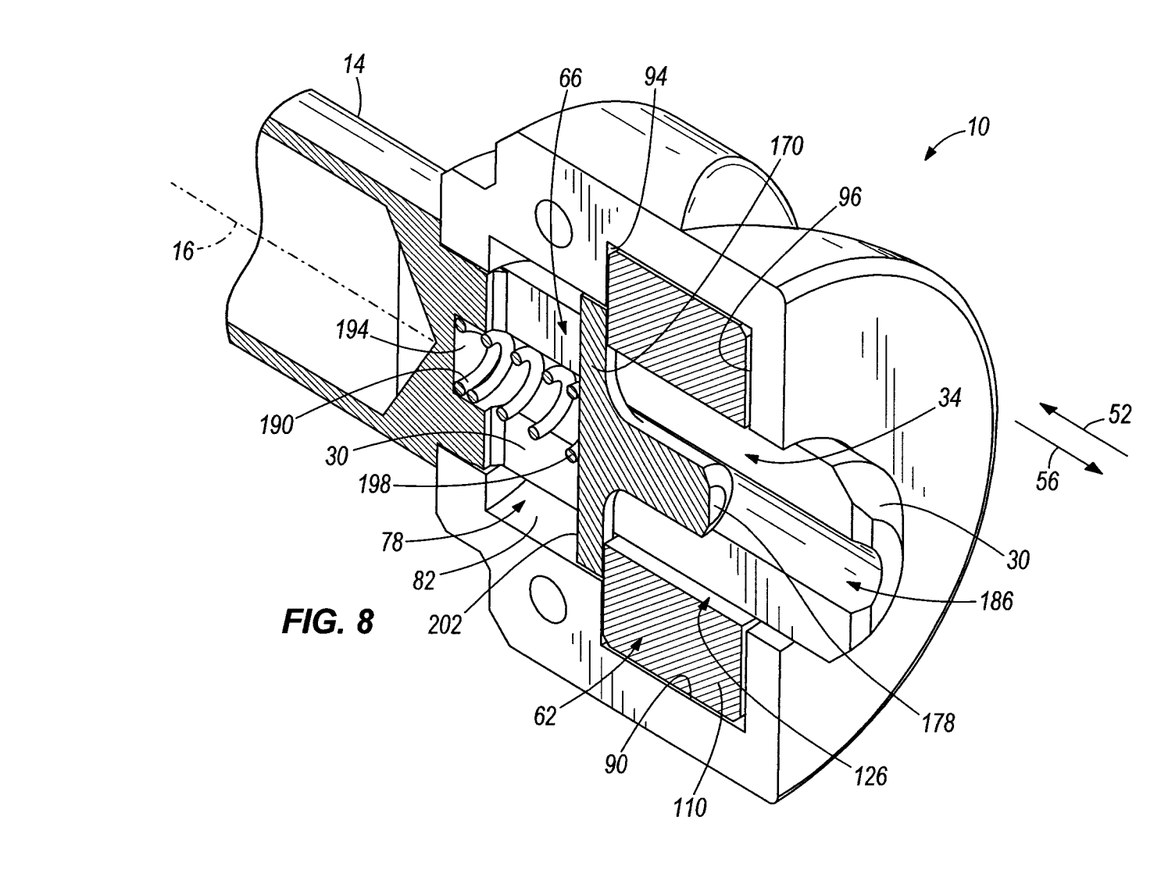
FIG. 8 is a sectional view of the blade clamp mechanism showing the blade clamp mechanism in the no-blade condition.

The ejection system 66 includes an ejector 170, or plunger, and a biasing member 174 (e.g., a spring). Referring to FIGS. 2 and 3, the ejector 170 includes a collar or frame 176, a hub 178, and flanges 182 attaching the frame 176 to the hub 178. As shown in FIGS. 2, 3 and 7, an axial channel 186 of the spindle 14 intersects the slot 34 of the spindle 14 and receives the biasing member 174 and the hub 178. The biasing member 174 resides in the channel 186 having a first leg 190 abutting a wall 194 of the channel 186 and a second leg 198 abutting a surface 202 of the hub 178 (FIG. 8). The biasing member 174 constitutes a second biasing member and is positioned to bias ejector 170 towards the blade 18 eject the blade 18 from the slot 34 of the spindle 14 and therein the housing 58. The frame 176 of the ejector 170 employs the housing channel or space 78 around the exterior surface 42 of the assembly seat 30, and the flanges 182 ride within the slot 34. The space 78, as shown in FIGS. 6 and 7, is a fixed space between the interior surfaces 82 of the housing 58 and the exterior surface 42 of the assembly seat 30 in which the frame 176 of the ejector 170 is operable to move axially for engagement and disengagement with the blade 18.

Referring to FIGS. 3-8, the blade clamp mechanism 10 generally has three conditions: an engaged condition, a released condition and a no-blade condition. In the engaged condition (FIGS. 3 and 6), the saw blade 14 is engaged with the spindle 14 for synchronized movement therewith. The detent 114 is biased into the aperture 54 of the blade 18 by the biasing member 118 to engage and secure the blade 18 with the spindle 14. The tab 122 of the actuator portion 110 (FIG. 3) extends from the housing 58 and is accessible by a user.

In the released condition (FIGS. 4 and 7), the blade 18 is disengaged from the spindle 14 to allow removal of the blade 18 from the blade clamp mechanism 10. The actuator portion 110 is pushed into the housing 58, against the biasing force of the biasing member 118, to compress the biasing member 118 and remove the detent 114 from the blade 18.

In the no-blade condition (FIGS. 5 and 8), the saw blade 14 is removed from the spindle 14 and the housing 58, and the detent 114 engages the ejector 170. The clamping system 62 is held in the released condition by the ejector 170 when the blade 18 is removed from the blade clamp mechanism 10.

The ejection system 66 generally has two conditions: an inserted or compressed condition and an ejection condition. In the inserted condition (FIGS. 3 and 6), the blade 18 is engaged with the spindle 14 via the detent 114. The ejection system 66 is held in the inserted condition, against the biasing force of the biasing member 174, by engagement of the clamping system 62 and the blade 18. In the ejected condition (FIGS. 5 and 8), the clamping system releases 62 the blade 18 and the ejection system 66 ejects the blade 18 from the blade clamp mechanism 10. The ejection system 66 is biased into the ejected condition by the biasing member 174, because the clamping system 62 no longer holds the blade 18 in position, and holds the clamping system 62 (i.e., the detent 114) in the released condition. In the ejected condition, the ejector 170 locks or resists the detent 114 from entering the slot 34.

FIGS. 3 and 6 illustrate the blade clamp mechanism 10 in the engaged condition. To release or remove the blade 18 from the spindle 14 of the blade clamp mechanism 10, when in the engaged condition, force is applied (generally by a user) to the tab 122 of the clamping system 62 in the first transverse direction 144. The force compresses the biasing member 118 seated in the cavities 142, 158 of the actuator portion 110 and the spindle 14, respectively, and moves the actuator portion 110 in the first transverse direction 144 (i.e., the direction of the user applied force) relative to the housing 58 and the spindle 14. The actuator portion 110 moves from the engaged condition (FIGS. 3 and 6) toward the released condition (FIGS. 4 and 7). Movement of the actuator portion 110 forces the detent 114 threadably coupled in the button aperture 134 out of the blade aperture 54 to disengages the detent 114 from the blade 18.

With the detent 114 disengaged from the saw blade 18 (FIGS. 4 and 7), the biasing member 174 biases the ejector 170 from the inserted condition (FIGS. 3 and 6) toward the ejected condition (FIGS. 5 and 8). The hub 178 of the ejector 170, which is abutting the tang 26 of the blade 18, slides in the second axial direction 56 through the channel 186 of the assembly seat 30, thereby pushing the blade 18 in the second axial direction 56. The force of the biasing member 174 forces the blade 18 from the slot 34 via the hub 178. As the blade 18 ejects from the spindle 14, the detent 114 slides across the tang 26 of the blade 18 (in the absence of the blade aperture 54) and because the biasing member 118 forces the actuator portion 110 to the engaged condition, the detent 114 engages a locking surface 206 (shown in FIGS. 2 and 5) of the hub 178.

At this point, the ejection system 66 is in the ejected condition and the blade clamp mechanism 10 is in the no-blade condition (FIGS. 5 and 8). The biasing member 174 of the ejection system 66 forces the frame 176 to slide axially through the frame channel 78 and locks the frame 176 against the actuator portion 110. The hub 178 rests across the spindle aperture 38, taking the place of the tang 26 of the blade 18 and prevents the detent 114 from passing through to the channel 186. The detent 114 is locked against the locking surface 206 of the ejector 170, against the biasing force of the biasing member 118, which causes the clamping system 62 to be held in the released condition (FIGS. 5 and 8). That is, the biasing member 118 (FIG. 5) is held or compressed against the biasing force due to the engagement of the hub 178 and the detent 114.

To insert the blade 18, the tang 26 is pushed against the hub 178 of the ejection system 66 in the second axial direction 56, which compresses and opposes the biasing force of the biasing member 174. As the hub 178 is pushed axially toward the biasing member 174, the biasing member 118 of the clamping system 62 (shown in FIGS. 2-5) biases the actuator portion 110 and the detent 114. The detent 114 slides across the locking surface 206 of the hub 178 and then the tang 26 until the aperture 54 of the tang 26 aligns with the detent 114. The alignment of the tang aperture 54 and the detent 114 permits the detent 114 to engage the blade 18 (the engaged condition shown in FIGS. 3 and 6). The force of the biasing member 118 causes the detent 114 to automatically sit in the aperture 54 of the tang 26, locking the blade 18 into the blade clamp mechanism 10. Referring to FIGS. 4 and 5, the biasing member 118, positioned in the cavities 158, 142 of the spindle 14 and the actuator portion 110, moves the actuator portion 110 in the second transverse direction 148 to return the actuator portion 110 to the engaged condition (FIGS. 1, 3 and 6) and ready the power tool the system for use. As shown in FIG. 6, the ejector 170 is locked in the channel 186 of the assembly seat 30 between the tang 26 and the biasing member 174 (i.e., in the inserted condition) to restrain the biasing force of the biasing member 174.

Although the invention has been described in detail with reference to certain preferred embodiments, variations and modifications exist within the scope and spirit of one or more independent aspects of the invention as described.

What is claimed is:

1. A cutting tool clamp mechanism for a power tool including a spindle having a longitudinal axis and a slot configured to receive a cutting tool, the spindle configured to drive the cutting tool along the longitudinal axis, the cutting tool clamp mechanism comprising:

a housing supported by the spindle;
a clamping system supported by the housing, the clamping system including
   an engaging portion movable relative to the spindle,
   an actuator portion surrounding a portion of the spindle and coupled to the engaging portion, the actuator portion movable along a first axis substantially perpendicular to the longitudinal axis to move the engaging portion along the first axis, the actuator portion movable between an engaged condition, in which the engaging portion is configured to engage with the cutting tool to secure the cutting tool in the spindle, and a released condition, in which the engaging portion is configured to disengage with the cutting tool, and
   a first biasing member positioned between the spindle and the clamping system, and operable to bias the actuator portion along the first axis to bias the clamping system to the engaged condition,
a locking member movable to selectively hold the engaging portion in the released condition,
wherein when the cutting tool is removed from the housing, the locking member extends into the slot to contact the engaging portion to inhibit the engaging portion from moving toward the engaged condition such that the clamping system is held in the released, and upon insertion of the cutting tool into the housing, the locking member moves out of contact with the engaging portion and the clamping system automatically moves from the released condition to the engaged condition, wherein the locking member is moveable along a second axis that is substantially perpendicular to the first axis and parallel to the longitudinal axis of the spindle.

2. The cutting tool clamp mechanism of claim 1 wherein the engaging portion is threadingly coupled to the actuator.

3. The cutting tool clamp mechanism of claim 1 wherein the actuator portion includes a tab through which a cavity extends, the biasing mechanism being received within the cavity.

4. The cutting tool clamp mechanism of claim 1 further comprising an aperture extending from an exterior surface of the spindle to the slot, the engaging portion and the biasing mechanism being aligned with the aperture.

5. The cutting tool clamp mechanism of claim 1, wherein the actuator portion is configured to overcome the bias of the biasing member so as to move the engaging portion to the released condition.

6. The cutting tool clamp mechanism of claim 1, wherein the actuator portion extends from the housing.

7. The cutting tool clamp mechanism of claim 1, wherein the engaging portion is configured to sit in an aperture of the cutting tool to secure the cutting tool to the spindle.

8. The cutting tool clamp mechanism of claim 1, wherein the biasing member is a compression spring.

9. The cutting tool clamp mechanism of claim 1 wherein the locking member is configured to eject the cutting tool from the housing when the clamping system is in the released condition.

10. The cutting tool clamp mechanism of claim 1, wherein the locking member includes a hub and a biasing member for biasing the hub to the first position.

\* \* \* \* \*